(12) United States Patent
Kwon et al.

(10) Patent No.: US 12,570,255 B2
(45) Date of Patent: Mar. 10, 2026

(54) VEHICLE AND A METHOD FOR CONTROLLING THEREOF

(71) Applicants: HYUNDAI MOTOR COMPANY, Seoul (KR); KIA CORPORATION, Seoul (KR)

(72) Inventors: Yong Seok Kwon, Suwon-si (KR); Dae Seok Jeon, Hwaseong-si (KR); Dong Hyun Sung, Hwaseong-si (KR); Sang Min Lee, Seoul (KR); Tae Geun An, Yeongju-si (KR); Hyoung Jong Wi, Seoul (KR); Joon Ho Lee, Seoul (KR); Eung Seo Kim, Gwacheon-si (KR); Sang Yeob Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 151 days.

(21) Appl. No.: 18/526,733

(22) Filed: Dec. 1, 2023

(65) Prior Publication Data

US 2024/0239317 A1     Jul. 18, 2024

(30) Foreign Application Priority Data

Jan. 18, 2023    (KR) ........................ 10-2023-0007318

(51) Int. Cl.
    B60T 8/1755      (2006.01)
    B60R 21/0134     (2006.01)
(52) U.S. Cl.
    CPC ...... B60T 8/17558 (2013.01); B60R 21/0134 (2013.01); B60T 2201/022 (2013.01); B60T 2210/32 (2013.01)
(58) Field of Classification Search
    CPC .......... B60T 8/17558; B60T 2201/022; B60T 2210/32; B60R 21/0134; B60W 30/09;
         (Continued)

(56) References Cited

U.S. PATENT DOCUMENTS 7,444,241 B2 * 10/2008 Grimm ..................... B60T 7/22
                                           340/901
9,802,614 B1 * 10/2017 Yoon ................. B60W 30/0956
                   (Continued)

FOREIGN PATENT DOCUMENTS

CN        114364591 A * 4/2022 ............ B60W 50/14
DE    102004027983 A1 * 4/2005 ......... B60K 31/0008
                   (Continued)

OTHER PUBLICATIONS

"A Novel Cost Function for Decision-Making Strategies in Automotive Collision Avoidance Systems," Li et al., 2018 IEEE International Conference on Vehicular Electronics and Safety (ICVES) (2018, pp. 1-8); Dec. 7, 2018. (Year: 2018).*

(Continued)

*Primary Examiner* — Khoi H Tran
*Assistant Examiner* — Jorge O Peche
(74) *Attorney, Agent, or Firm* — Lempia Summerfield Katz LLC

(57) ABSTRACT

A method for controlling a vehicle is disclosed. The method includes determining whether one or more objects are present on both side lanes of the vehicle in response to identification of a front object positioned on a lane in which the vehicle is positioned. The method also includes determining, when the one or more objects are present on both side lanes of the vehicle, whether steering for avoiding collision with the one or more objects on both side lanes of the vehicle is possible based on physical quantity information of the vehicle and the front object. The method additionally includes determining a braking control time of the vehicle based on the determination of whether steering for avoiding collision is possible. The method further includes controlling brakes of the vehicle at the determined braking control time.

14 Claims, 14 Drawing Sheets

(58) Field of Classification Search

CPC ...... B60W 10/18; B60W 10/20; B60W 40/04; B60W 2420/403; B60W 2420/408; B60W 2554/802; B60W 2554/804

See application file for complete search history.

(56) References Cited

U.S. PATENT DOCUMENTS

| | | | | |
|---|---|---|---|---|
| 9,815,459 | B2 * | 11/2017 | Sasabuchi | B60W 30/08 |
| 10,308,245 | B2 | 6/2019 | Lee et al. | |
| 10,351,128 | B2 * | 7/2019 | Sung | B60W 10/184 |
| 10,369,992 | B2 * | 8/2019 | Ji | B60W 30/0953 |
| 10,632,914 | B2 * | 4/2020 | Hakki | B60Q 1/50 |
| 11,427,166 | B2 * | 8/2022 | Kim | B60T 8/58 |
| 12,139,133 | B1 * | 11/2024 | Schleede | B60W 10/18 |
| 12,162,500 | B1 * | 12/2024 | Egbert | B60W 50/0205 |
| 2002/0087253 | A1 * | 7/2002 | Jeon | G06T 7/70 |
| | | | | 180/170 |
| 2006/0020389 | A1 * | 1/2006 | Yamamoto | G01C 21/26 |
| | | | | 348/148 |
| 2009/0088925 | A1 * | 4/2009 | Sugawara | B60W 30/12 |
| | | | | 340/436 |
| 2009/0143951 | A1 * | 6/2009 | Takahashi | B60W 30/09 |
| | | | | 701/70 |
| 2009/0192710 | A1 * | 7/2009 | Eidehall | B60W 50/0097 |
| | | | | 701/300 |
| 2010/0014711 | A1 * | 1/2010 | Camhi | B60Q 3/80 |
| | | | | 382/104 |
| 2010/0063736 | A1 * | 3/2010 | Hoetzer | B60W 30/09 |
| | | | | 701/301 |
| 2011/0130936 | A1 * | 6/2011 | Noda | G08G 1/167 |
| | | | | 701/70 |
| 2011/0288774 | A1 * | 11/2011 | Bengtsson | G08G 1/165 |
| | | | | 701/301 |
| 2013/0338878 | A1 * | 12/2013 | Fritz | B60W 10/20 |
| | | | | 701/1 |
| 2015/0120137 | A1 * | 4/2015 | Zeng | B60R 21/0134 |
| | | | | 701/41 |
| 2015/0120138 | A1 * | 4/2015 | Zeng | G01S 13/931 |
| | | | | 701/41 |
| 2015/0142299 | A1 * | 5/2015 | Shin | G06V 20/58 |
| | | | | 701/301 |
| 2015/0232090 | A1 * | 8/2015 | Jeon | B60W 50/14 |
| | | | | 701/1 |
| 2015/0321699 | A1 * | 11/2015 | Rebhan | B60W 30/18163 |
| | | | | 701/23 |
| 2015/0329112 | A1 * | 11/2015 | Jeon | B60W 30/18109 |
| | | | | 701/41 |
| 2015/0360697 | A1 * | 12/2015 | Baek | B60W 40/09 |
| | | | | 701/23 |
| 2016/0039411 | A1 * | 2/2016 | Park | G01S 13/931 |
| | | | | 701/70 |
| 2016/0114798 | A1 * | 4/2016 | Kim | G01S 13/867 |
| | | | | 701/41 |
| 2017/0113665 | A1 * | 4/2017 | Mudalige | G08G 1/163 |
| 2017/0113668 | A1 * | 4/2017 | Jeon | B60T 7/22 |

| | | | | |
|---|---|---|---|---|
| 2017/0113683 | A1 * | 4/2017 | Mudalige | B60W 30/0956 |
| 2017/0129434 | A1 * | 5/2017 | Sun | B60W 30/0953 |
| 2017/0144657 | A1 * | 5/2017 | Hassani | B60W 30/09 |
| 2017/0345310 | A1 * | 11/2017 | Yoon | G08G 1/161 |
| 2018/0162386 | A1 * | 6/2018 | Lee | G08G 1/166 |
| 2018/0162387 | A1 * | 6/2018 | Sung | B60W 30/09 |
| 2018/0178790 | A1 * | 6/2018 | Oguri | G08G 1/166 |
| 2018/0297591 | A1 * | 10/2018 | Minemura | B60W 40/00 |
| 2019/0005821 | A1 * | 1/2019 | Matsunaga | G01S 13/931 |
| 2019/0012920 | A1 * | 1/2019 | Tamura | B60W 30/09 |
| 2019/0071093 | A1 * | 3/2019 | Ma | G05D 1/0214 |
| 2019/0073906 | A1 * | 3/2019 | Matsunaga | B60W 30/09 |
| 2019/0143968 | A1 * | 5/2019 | Song | B60W 10/18 |
| 2019/0270448 | A1 * | 9/2019 | Takasao | B60W 10/18 |
| 2020/0361430 | A1 * | 11/2020 | Kim | B60T 8/171 |
| 2020/0377079 | A1 * | 12/2020 | Sung | B60W 30/0956 |
| 2022/0227367 | A1 * | 7/2022 | Kario | G06V 40/103 |
| 2022/0281443 | A1 * | 9/2022 | Sung | B60W 40/08 |
| 2023/0101872 | A1 * | 3/2023 | Kwon | B60W 30/095 |
| | | | | 701/26 |
| 2023/0174115 | A1 * | 6/2023 | Fei | B60W 60/0015 |
| 2023/0227027 | A1 * | 7/2023 | Sung | G01S 13/867 |
| | | | | 701/301 |
| 2023/0234573 | A1 * | 7/2023 | Iwase | B60W 30/0956 |
| | | | | 701/26 |
| 2023/0316735 | A1 * | 10/2023 | Lee | B60R 11/04 |
| | | | | 382/104 |
| 2023/0322208 | A1 * | 10/2023 | Rojas | B60W 50/085 |
| | | | | 701/41 |
| 2023/0398982 | A1 * | 12/2023 | Kwon | B60W 50/14 |
| 2024/0239317 | A1 * | 7/2024 | Kwon | B60R 21/0134 |
| 2024/0239334 | A1 * | 7/2024 | Sung | B60W 10/18 |
| 2024/0416900 | A1 * | 12/2024 | Kim | B60W 30/10 |
| 2025/0065894 | A1 * | 2/2025 | Luo | B60W 50/0205 |

FOREIGN PATENT DOCUMENTS

| | | | | | |
|---|---|---|---|---|---|
| DE | 102016121873 | A1 * | 5/2017 | | B60W 10/20 |
| DE | 102020112686 | A1 * | 11/2020 | | B60W 40/02 |
| KR | 20180065585 | A | 6/2018 | | |
| KR | 20180066524 | A | 6/2018 | | |

OTHER PUBLICATIONS

"Collision Warning and Avoidance System;" Peisen et al., 2020 International Conference on Intelligent Computing and Human-Computer Interaction (ICHCI) (2020, pp. 298-303); May 29, 2021. (Year: 2021).*

"Design of an Adaptive Cruise Control / Collision Avoidance with lane change support for vehicle autonomous driving;" Kim et al., 2009 ICCAS-SICE (2009, pp. 2938-2943); Aug. 1, 2009. (Year: 2009).*

"Autonomous Emergency Braking of a Heavy Road Vehicle Using a Low-Density Flash Lidar;" Kumar et al., IEEE Transactions on Vehicular Technology (vol. 73, Issue: 2, 2024, pp. 1879-1889); Feb. 1, 2024. (Year: 2024).*

* cited by examiner (a)

(b)

(a)

0: Steering for avoiding collision possible /
1: Steering for avoiding collision impossible

| Steering for avoiding collision possible | Determining result | Specific condition |
|---|---|---|
| $C_{RE,left}$ | 1 | |
| $C_{RE,right}$ | 0 | |
| $C_{GO,left}$ | 0 | 1 |
| $C_{GO,right}$ | 1 | |

(b)

(a)

0: Steering for avoiding collision possible /
1: Steering for avoiding collision impossible

| Steering for avoiding collision possible | Determining result | Specific condition |
|---|---|---|
| $C_{RE,left}$ | 1 | |
| $C_{RE,right}$ | 0 | 0 |
| $C_{GO,left}$ | 0 | |
| $C_{GO,right}$ | 0 | |

(b)

(a)

0: Steering for avoiding collision possible /
1: Steering for avoiding collision impossible

| Steering for avoiding collision possible | Determining result | Specific condition |
|---|---|---|
| $C_{RE,left}$ | 0 | |
| $C_{RE,right}$ | 0 | |
| $C_{GO,left}$ | 0 | 0 |
| $C_{GO,right}$ | 1 | |

(b)

0: Steering for avoiding collision possible /
1: Steering for avoiding collision impossible

| Steering for avoiding collision possible | Determining result | Specific condition |
|---|---|---|
| $C_{RE,left}$ | 0 | |
| $C_{RE,right}$ | 0 | 1 |
| $C_{GO,left}$ | 1 | |
| $C_{GO,right}$ | 1 | |

(a)　　　　　　　　　　　　　　　(b)

VEHICLE AND A METHOD FOR CONTROLLING THEREOF

CROSS-REFERENCE TO RELATED APPLICATION

The present application claims the benefit of and priority to Korean Patent Application No. 10-2023-0007318, filed on Jan. 18, 2023, the entire contents of which are incorporated herein by reference.

FIELD

The present disclosure relates to a vehicle including a collision preventing assistance system, and a method for controlling the same.

BACKGROUND

In order to prevent a collision accident, a conventional vehicle can provide warnings and perform automatic braking of the vehicle by using a front camera, a front radar, etc. to determine whether a collision with a vehicle and/or a pedestrian positioned in front of the vehicle can occur.

For example, a technology has been developed for controlling a vehicle so that a braking force of the vehicle is maximized when a driver of the vehicle presses a braking pedal strongly in a situation where there is a risk of collision of the vehicle. In addition, a technology has been developed for turning off the system of the vehicle when a power vehicle strongly presses the acceleration pedal in a situation where there is a risk of collision of the vehicle.

Generally, when a vehicle travels at a relatively higher speed, as compared to when a vehicle travels at relatively lower speed, the number of casualties increases in the event of a vehicular collision. For example, when a collision occurs in a vehicle, the possibility of injury is increased by two times or more when the speed of the vehicle is increased by 5 km/h when the vehicle is traveling at a speed of 60 km/h or more as compared to when the vehicle is traveling at a lower speed.

The statements in this section merely provide background information related to the present disclosure and may not constitute prior art.

SUMMARY

Accordingly, a technology capable of preventing a vehicle from colliding for situations of collision risks of vehicles during high-speed driving is desired.

An embodiment of the present disclosure provides a vehicle capable of optimizing an operation of a forward collision avoidance (FCA) system of the vehicle during high-speed driving of the vehicle, and a control method thereof.

For example, the vehicle and the control method thereof can recognize a surrounding object of the vehicle, such as a guardrail and/or a general stationary obstacle, using a sensor such as a front camera and/or a front-side LiDAR of the vehicle. In addition, the vehicle and the control method thereof can change the time control of the vehicle when it is determined that steering for collision avoidance is impossible regardless of the driving lane of the vehicle based on the recognition of the surrounding object of the vehicle. In addition, the vehicle and the control method thereof may optimize the control of avoiding collision according to the operation of the FCA system even in a situation in which the vehicle is driving at a high speed, thereby minimizing serious injury to a passenger of the vehicle, by varying the time control of the vehicle.

According to an embodiment, a method for controlling a vehicle is provided. The method includes determining whether one or more objects are present on both side lanes of the vehicle in response to identification of a front object positioned on a lane in which the vehicle is positioned. The method also includes determining, when the one or more objects are present on both side lanes of the vehicle, whether steering for avoiding collision with the one or more objects on both side lanes of the vehicle is possible based on physical quantity information of the vehicle and the front object. The method further includes determining a braking control time of the vehicle based on the determination of whether steering for avoiding collision is possible. The method additionally includes controlling brakes of the vehicle at the determined braking control time.

In at least one embodiment of the present disclosure, the identification of the front object and the determination of whether the one or more objects are present on the both side lanes are based on data of a sensor including at least one of a camera, a radar, or a LiDAR.

In at least one embodiment of the present disclosure, determining whether steering for avoiding collision is possible includes determining a safety zone for the vehicle based on the physical quantity information of the vehicle and the front object; and determining whether steering for avoiding collision is possible based on the determined safety zone.

In at least one embodiment of the present disclosure, determining the safety zone of the vehicle includes determining a longitudinal length of the safety zone based on a relative distance, a relative speed, and a relative acceleration with respect to the front object, and determining a width of one lane of a road where the vehicle travels as a lateral length of the safety zone.

In at least one embodiment of the present disclosure, determining whether the object is present on the both side lanes includes determining whether a road edge object or a general obstacle is present on at least one of the both side lanes.

In at least one embodiment of the present disclosure, determining whether steering for avoiding collision is possible includes determining whether a first collision occurs between the safety zone and the front object based on four first straight lines of edges of the safety zone and four second straight lines of edges of an object box indicating the front object, when the road edge object is present on at least one of the both side lanes. Determining whether the collision avoidance is possible also includes determining whether a second collision occurs between the safety zone and the road edge object based on the four first straight lines and a third straight line connecting points of the road edge object. Determining whether the collision avoidance is possible further includes determining whether steering for avoiding collision is possible for the object on the both side lanes based on a result of determining whether the first collision occurs and a result of determining whether the second collision occurs.

In at least one embodiment of the present disclosure, determining whether the first collision occurs includes determining at least one intersection point between the four first straight lines and the four second straight lines and determining that the safety zone collides with the front object when the at least one intersection point is positioned in the safety zone.

In at least one embodiment of the present disclosure, determining whether the second collision occurs includes determining at least one intersection point between the four first straight lines and the third straight line and determining that the safety zone collides with the front object when the at least one intersection points is positioned in the safety zone.

In at least one embodiment of the present disclosure, determining whether steering for avoiding collision is possible includes determining whether steering for avoiding collision is possible for the general object based on a comparison between a longitudinal length of the safety zone and a longitudinal length of the general obstacle when the general obstacle is present on at least one of the both side lanes.

In at least one embodiment of the present disclosure, determining whether steering for avoiding collision is possible includes determining a first coordinate of an outermost point of the front object closest to the general obstacle. Determining whether the collision avoidance is possible also includes determining a second coordinate of an outermost point of the general obstacle closest to the front object, determining a separated distance between the front object and the general obstacle based on the first coordinate and the second coordinate. Determining whether the collision avoidance is possible additionally includes determining whether steering for avoiding collision is possible for the general object based on the comparison between the separated distance and a width of one lane of a road where the vehicle travels.

According to another embodiment of the present disclosure, a vehicle is provided. The vehicle comprises an interface configured to receive data from a sensor. The vehicle also comprises a processor configured to be communicatively or electrically connected to the interface. The processor is configured to identify a front object positioned on a same lane as the vehicle based on the data received through the interface. The processor is also configured to determine whether one or more objects are present on both side lanes of the vehicle based on the data received through the interface in response to identification of the front object. The processor is further configured to, when the one or more objects are present on both side lanes, determine whether steering for avoiding collision with the one or more objects on both side lanes of the vehicle is possible based on physical quantity information of the vehicle and the front object. The processor is additionally configured to determine a braking control time of the vehicle based on the determination of whether steering for avoiding collision is possible. The processor is additionally configured to output a control signal to enable a braking control of the vehicle at the braking control time.

In at least one embodied vehicle of the present disclosure, the sensor comprises at least one of a camera, a radar, or a LiDAR.

In at least one embodied vehicle of the present disclosure, the processor is configured to determine a safety zone for the vehicle based on the physical quantity information of the vehicle and the front object, and determine whether steering for avoiding collision is possible based on the determined safety zone.

In at least one embodied vehicle of the present disclosure, the processor is further configured to determine a longitudinal length of the safety zone based on a relative distance, a relative speed, and a relative acceleration of the front object, and determine a width of one lane of a road where the vehicle travels as a lateral length of the safety zone.

In at least one embodied vehicle of the present disclosure, the processor is further configured to determine whether a road edge object or a general obstacle is present on at least one of the both side lanes.

In at least one embodied vehicle of the present disclosure, when the road edge object is present on at least one of the both side lanes, the processor is further configured to determine a first collision between the safety zone and the front object based on four first straight lines of edges of the safety zone and four second straight lines of edges of an object box indicating the front object. The processor is also configured to determine a second collision between the safety zone and the road edge object based on the four first straight lines and a third straight line connecting points of the road edge object. The processor is additionally configured to determine whether steering for avoiding collision is possible based on a result of determining whether the first collision occurs and a result of determining whether the second collision occurs.

In at least one embodied vehicle of the present disclosure, the processor is configured to determine at least one intersection point between the four first straight lines and the four second straight lines and determining that the safety zone and the front object collide when the at least one intersection point is positioned in the safety zone.

In at least one embodied vehicle of the present disclosure, the processor is further configured to determine at least one intersection point between the four first straight lines and the third straight line and determine that the safety zone and the front object collide when the at least one intersection point is positioned in the safety zone.

In at least one embodied vehicle of the present disclosure, the processor is further configured to determine whether steering for avoiding collision is possible with respect to the general object based on a comparison between a longitudinal length of the safety zone and a longitudinal length of the general obstacle, when the general obstacle is present on at least one of the both side lanes.

In at least one embodied vehicle of the present disclosure, the processor is further configured to determine a first coordinate of an outermost point of the front object closest to the general obstacle, determine a second coordinate of an outermost point of the general obstacle closest to the front object. The processor is also configured to determine a separated distance between the front object and the general obstacle based on the first coordinate and the second coordinate. The processor is additionally configured to determine whether steering for avoiding collision is possible for the general object based on the comparison between the separated distance and a width of one lane of a road where the vehicle travels.

According to an embodiment of the present disclosure, the vehicle and the control method thereof provide a control technology for avoiding collision between the vehicle and an object depending on the determination of whether one or more objects are present on both sides of a driving lane of the vehicle when a front object is present in front on a same lane as the driving lane of the vehicle.

In embodiments, the vehicle and the control method thereof provide a technology of performing braking control of the vehicle through steering for avoiding collision or changing the time of braking control of the vehicle by determining whether steering control for avoiding collision of the vehicle is possible when a target object is in front of the vehicle on the same lane as the vehicle is present and one or more objects on both side lanes of the vehicle are present.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
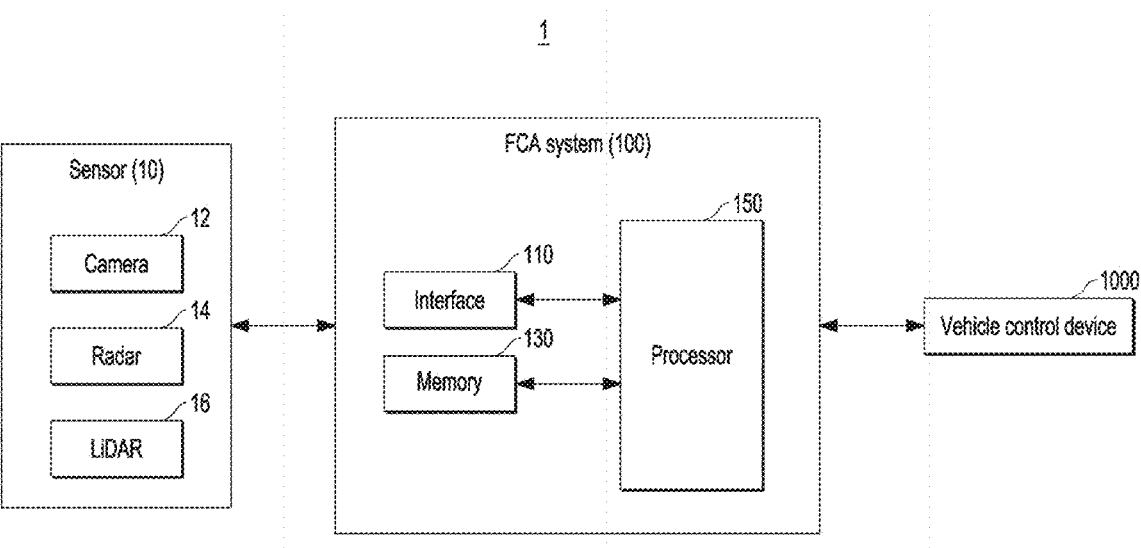
FIG. 1 is a block drawing of a vehicle, according to an embodiment of the present disclosure.

Like reference numerals refer to like elements throughout the specification. The present specification does not necessarily describe all elements of the embodiments. General contents in the technical field to which the present disclosure pertains or overlapping contents between the embodiments may have been omitted. The terms, "unit", "module", or "device", used in the specification may be implemented by software, hardware, or a combination thereof. According to embodiments, a plurality of "units", "modules", or "devices" may be implemented as one element or one "unit", "module", or "device" may include a plurality of elements.

Throughout the specification, when a part is described as "connected" to another part, this includes not only a case of the part being directly connected to the other part but also a case of the part being indirectly connected to the other part. The indirect connection may include being connected through a wireless communication network, for example.

In addition, when a part "includes" an element, this means that other elements are further included rather than excluding other elements, unless specifically stated otherwise.

The terms, "first", "second", etc., are used to distinguish one element from another element, and the elements are not limited by these terms.

A singular expression may include a plural expression unless there is a clear exception in the context.

In descriptions of steps, operations, etc., identification symbols are used for convenience of description, and the identification symbols do not necessarily describe the order of the steps, operations, etc. Each step or operation may be performed differently from the stated order unless a specific order is clearly described in the context.

When a component, device, element, or the like of the present disclosure is described as having a purpose or performing an operation, function, or the like, the component, device, or element should be considered herein as being "configured to" meet that purpose or perform that operation or function.

Hereinafter, operation principles and embodiments of the present disclosure are described with reference to the accompanying drawings.

Figure 2:
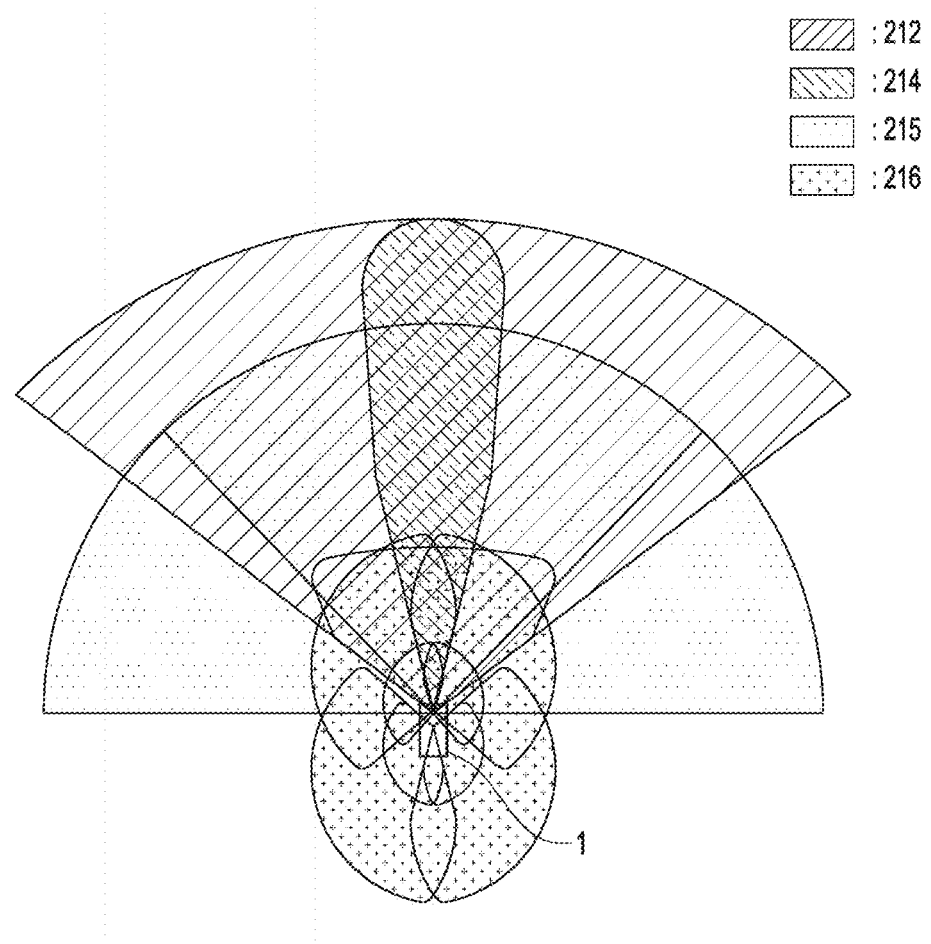
FIG. 2 is a drawing for describing a sensor of a vehicle, according to an embodiment of the present disclosure.
Figure 3:
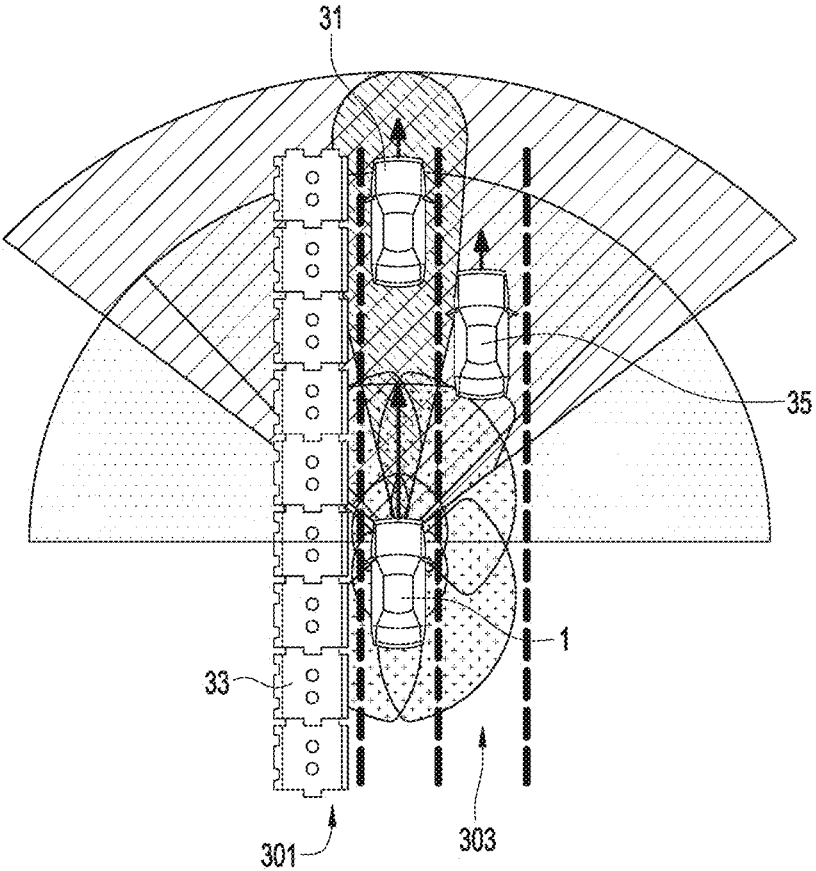
FIG. 3 is a drawing for describing a control operation of a vehicle, according to an embodiment of the present disclosure.
Figure 4:
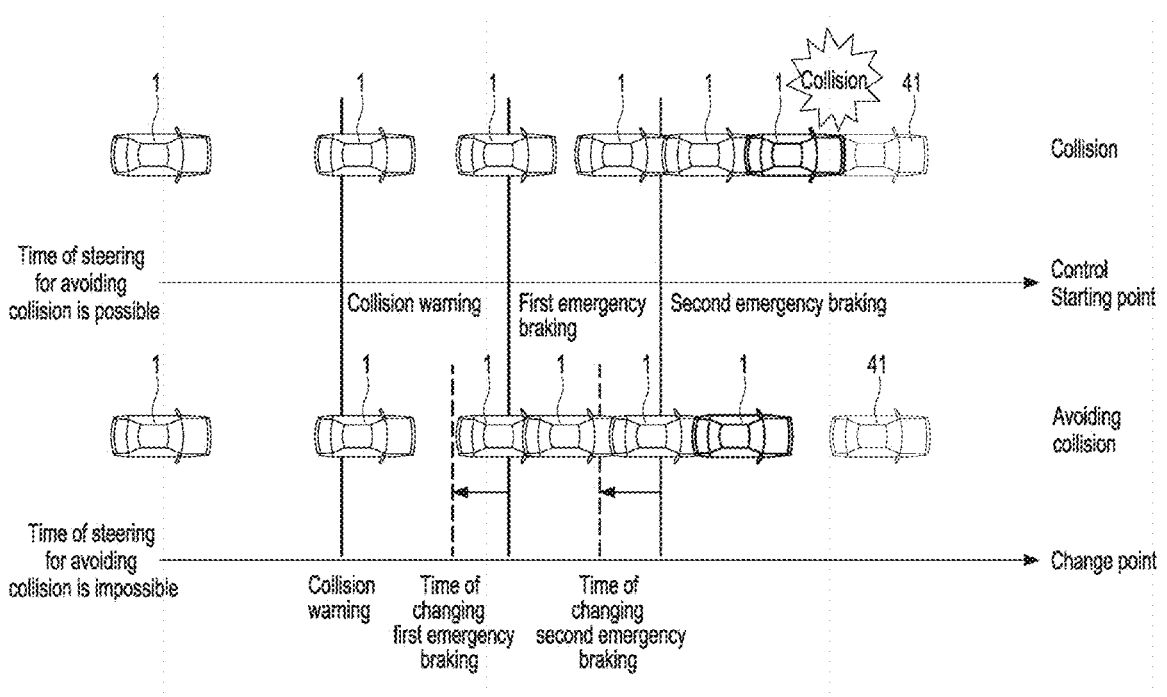
FIG. 4 is a drawing for describing a determining a time point of control of a vehicle, according to an embodiment of the present disclosure.

FIG. 1 is a block drawing of a vehicle, according to an embodiment. FIG. 2 is a drawing for describing a sensor of a vehicle, according to an embodiment. FIG. 3 is a drawing for describing a control operation of a vehicle, according to an embodiment. FIG. 4 is a drawing for describing a determining a time point of control of a vehicle, according to an embodiment.

Referring to FIG. 1, a vehicle 1 includes a sensor 10, a forward collision avoidance (FCA) system 100, and/or a vehicle control device 1000.

The sensor 10 includes one or more device capable of acquiring information about the vehicle 1 and/or information about the surroundings of the vehicle 1.

The sensor 10 includes a camera 12, a radar 14, and/or a light detection and ranging (LiDAR) 16.

The camera 12 may monitor the peripheries of vehicle 1 by acquiring image data of the surroundings of vehicle 1.

In embodiments, the camera 12 includes a camera positioned in front of the vehicle 1 to have a sensing field of view 212 toward the front of the vehicle 1 as illustrated in FIG. 2.

The radar 14 may detect surrounding objects of the vehicle 1.

In embodiments, the radar 14 includes one or more radars installed on the vehicle 1 to have a sensing field of view 214 facing front of the vehicle 1 and/or a sensing field of view 216 facing the front and rear sides of the vehicle 1 as shown in FIG. 2.

The LiDAR 16 detects objects by scanning the surrounding of the vehicle 1.

In embodiments, vehicle 1 may include one or more LiDARs 16. The one or more LiDARs 16 may be mounted outside the main body of the vehicle 1 to emit a laser pulse toward the surrounding of the vehicle 1 to generate LiDAR data, e,g., point cloud data (hereinafter, also referred to as simply data).

In an embodiment, the LiDAR 16 is installed on the vehicle 1 to have a field of sensing 215 toward the front side of the vehicle 1 as shown in FIG. 2.

The FCA system 100 includes an interface 110, a memory 130, and/or a processor 150.

The interface 110 transfers instructions or data inputs from another device of the vehicle 1, e.g., the sensor 10, or the user, to another element of the FCA system 100 or outputs instructions or data received from another element of the FCA system 100, to another device of the vehicle 1.

The interface 110 includes a communication module (not shown) to communicate with other devices of the vehicle 1, e.g., the sensor 10, and/or an external system outside the vehicle 1.

In embodiments, the communication module may include a communication module capable of performing communication between devices of the vehicle 1, for example, controller area network (CAN) communication and/or local interconnect network (LIN) communication, through a vehicle communication network. Further, the communication module may include a wired communication module (e.g., a power line communication module) and/or a wireless communication module (e.g., a cellular communication module, a Wi-Fi communication module, a short-range wireless communication module, and/or a global navigation satellite system (GNSS) communication module).

The memory 130 stores various data used by at least one element of the FCA system 100, e.g., input data and/or output data for a software program and commands related thereto.

The memory 130 may include a nonvolatile memory such as a cache, a Read Only Memory (ROM), a Programmable ROM (PROM), an Erasable Programmable ROM (EPROM), an Electrically Erasable Programmable ROM (EEPROM), and/or a flash memory, and/or a volatile memory such as a Random Access Memory (RAM).

The processor 150 (also referred to herein as a control circuit or a controller) may control at least one other element (e.g., a hardware element (e.g., the interface 110 and/or the memory 130) and/or a software element (a software program)) of the FCA system 100, and performs various data process and operations.

Referring to FIG. 3, the processor 150 may identify a front object 31 positioned in front of the same lane as the vehicle 1 based on the data of the sensor 10.

For example, the processor 150 may identify the front object 31 when there is the front object 31, and may determine whether the front object 31 is positioned in front on the same lane as the vehicle 1, based on free space information acquired based on data of the sensor 10. The free space information may refer to information about areas where objects such as obstacles do not exist and the vehicle 1 is actually able to travel.

the front object 31 may include objects such as vehicles, motorcycles, and/or bicycles, for example.

In response to the identification of the front object 31, the processor 150 may determine whether an object is present on each of the two side lanes 301 and 303 of the vehicle 1 based on the data of the sensor 10, and may identify the object when the object is present.

For example, the processor 150 may determine whether one or more objects are present on each of the two side lanes 301 and 303 of the vehicle 1 based on the free space information.

The objects on the two side lanes 301 and 303 may include road edge objects including guardrails and/or curbs. Further, the objects on the two side lanes 301 and 303 may include general obstacles including rocks, trees, animals, and/or the like.

Further, the objects on the two side lanes 301 and 303 may include objects such as vehicles, bicycles, and/or motorcycles.

For example, when objects 33 and 35 are present on the two side lanes 301 and 303 on both sides of the vehicle 1 as illustrated in FIG. 3, the processor 150 may determine whether steering for avoiding collision with the objects 33 and 35 on the two side lanes 301 and 303 of the vehicle 10 is possible based on physical quantity information of the vehicle 1 and the front object 31.

The physical quantity information of the vehicle 1 and the front object 31 may include the speed of the vehicle 1, the acceleration of the vehicle 1, the speed of the front object 31, and/or the acceleration of the front object 31.

The processor 150 may also determine the safety area of the vehicle 1 based on the position information of the vehicle 1, the position information of the front object 31, the predetermined parameter, and/or the width length of one lane of the road on which the vehicle 1 is driving, to the physical quantity information of the vehicle 1 and the front object 31.

In addition, the processor 150 may determine whether steering of avoiding collision is possible against the objects

33 and 35 on two side lanes 301 and 303 of vehicle 10 based on the determined safety zone.

For example, the processor 150 may determine whether a collision between the safety zone and the front object can occur.

In addition, the processor 150 may determine whether a collision between the safety zone and the road edge object can occur.

In addition, the processor 150 may determine whether first steering for avoiding collision is possible without colliding against the front object and the road edge object that is present on at least one of the two side lanes of the vehicle 1 based on the result of determining whether the collision with the front object can occur and the result of determining whether the collision between the safety zone and the road edge object can occur.

In addition, the processor 150 may determine the safety zone and whether second steering for avoiding collision is possible without colliding against the general obstacle that is present on at least one of the two side lanes of the vehicle 1 and the front vehicle, based on a lateral position and/or a longitudinal position of the general obstacle present on at least one of the both side lanes of the vehicle 1 and the front object.

In addition, the processor 150 may determines whether steering for avoiding collision is possible on both side lanes of the main lane of the vehicle 1 based on the result of determination to whether the first steering for avoiding collision is possible and the result of determination to whether the second steering for avoiding collision is possible.

The processor 150 may determine the time of braking control of the vehicle 1 based on the determination of whether steering for avoiding collision is possible.

For example, when steering for avoiding collision is possible, the processor 150 may determine the time of braking control of the vehicle 1 based on a distance between the vehicle 1 and the preceding vehicle 41.

Referring to FIG. 4, when it is determined that steering for avoiding collision is possible, the processor 150 may determine time of braking control according to the distance from a preceding vehicle 41 positioned in front of the same lane as the vehicle 1.

The braking control may include primary emergency braking and/or secondary emergency braking. The determination of the time of braking control may consider the speeds of the vehicle 1 and the preceding vehicle 41.

In an embodiment, a time output of collision warning, a primary emergency braking time, and/or a secondary emergency braking time may be stored in the memory 130 for each predetermined distance to an object positioned in front on the same lane as the vehicle 1 and related information are previously stored, and the processor 150 may output a signal for controlling the vehicle 1 based on the information stored in the memory 130.

For example, the processor 150 outputs a collision warning before braking control, subsequently performs the primary emergency braking, and then performs secondary emergency braking, according to the distance from the preceding vehicle 41 positioned in front of the same lane as the vehicle 1, as shown in FIG. 4, based on the above information stored in the memory 130.

In addition, when steering for avoiding collision is not possible, the processor 150 may change the time of braking control of the vehicle 1 to determine the time of braking control of the vehicle 1.

Referring to FIG. 4, when determining that steering for avoiding collision is impossible, the processor 150 changes a predetermined time of braking (also referred to as an original time point) when steering for avoiding collision is possible, according to a distance between the vehicle 1 and the preceding vehicle 41 positioned in front on the same lane as the vehicle 1. The speed of the vehicle 1 and the speed of the preceding vehicle 41 may be considered in order to change the time of braking.

In an embodiment, an output of collision warning when steering for avoiding collision is impossible is predetermined to be the same as when steering for avoiding collision is possible and stored in the memory 130.

In addition, the first emergency braking time when steering for avoiding collision is impossible is predetermined as a time earlier than the first emergency braking time when steering for avoiding collision is possible by a predetermined time and stored in the memory 130. In other words, the first emergency braking time when steering for avoiding collision is impossible is predetermined as the first distance between the vehicle 1 and the front object 41 such that the first emergency braking is performed at a distance shorter than the first emergency braking time when steering for avoiding collision is possible.

In addition, a secondary emergency braking time in the case in which steering for avoiding collision is impossible is predetermined as the time earlier than the secondary emergency braking time in the case in which steering for avoiding collision is possible by a predetermined time and stored in the memory 130. In other words, the second emergency braking point in time when steering for avoiding collision is impossible is predetermined such that the second distance between the vehicle 1 and the front object 41 is predetermined so that the second emergency braking is performed at a distance shorter than the second emergency braking time when steering for avoiding collision is possible.

The processor 150 controls braking of the vehicle 1 at the determined time of braking control.

Referring to FIG. 4, when the processor 150 outputs a signal so that the vehicle 1 performs braking control at the time of braking when steering for avoiding collision is possible, e.g., at a primary emergency braking time and/or a secondary emergency braking time, a collision between the vehicle 1 and the preceding vehicle 41 may occur.

However, according to an embodiment of the present disclosure, when steering for avoiding collision of the vehicle 1 is not possible, the collision between the vehicle 1 and the preceding vehicle 41 can be avoided when the processor 150 changes the time of braking control, e.g., the primary emergency braking time and/or the secondary emergency braking time, and then outputs a signal so that the vehicle 1 performs the primary control at the changed time of braking control.

Figure 5:
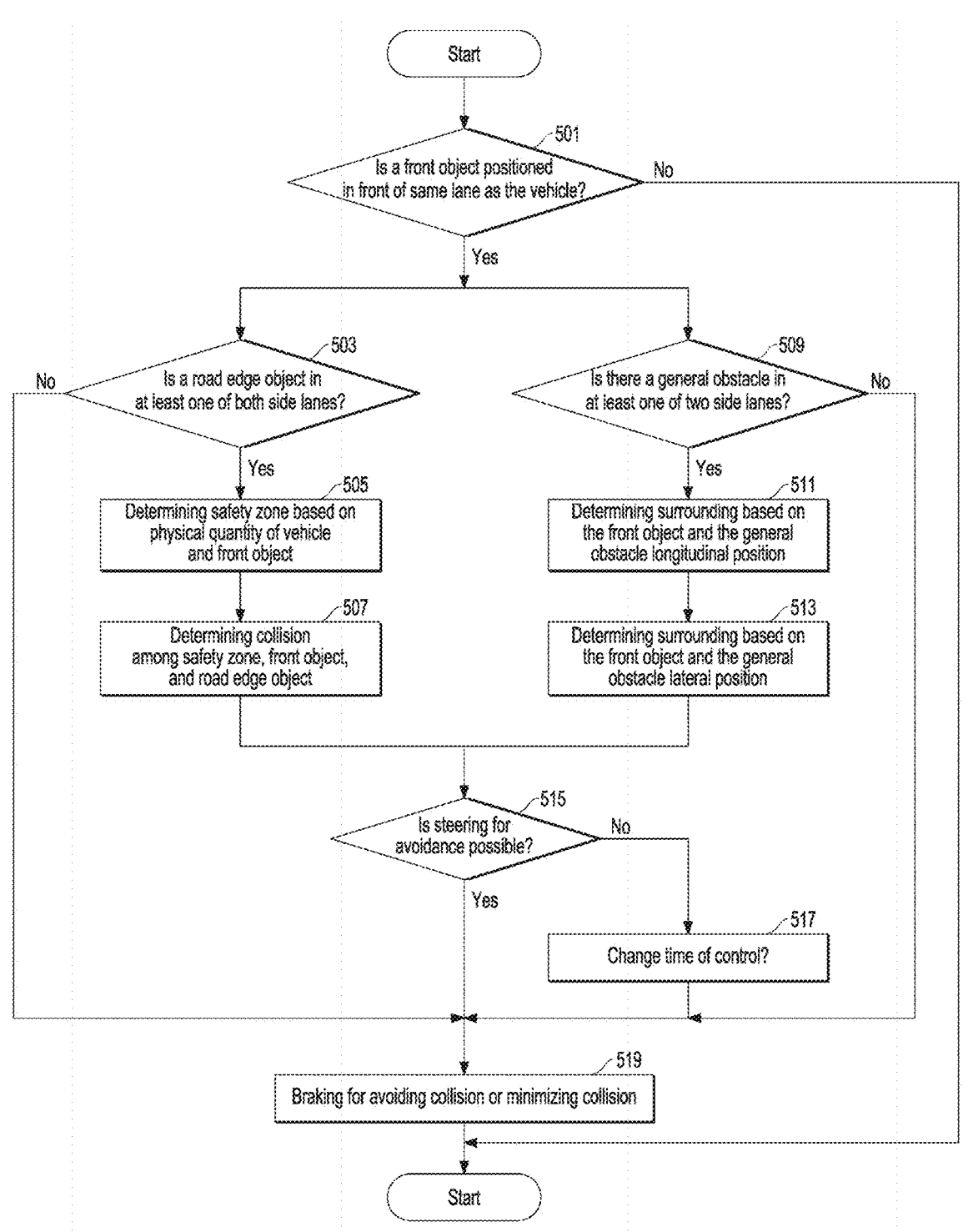
FIG. 5 is a drawing illustrating a control operation of a vehicle, according to an embodiment of the present disclosure.

FIG. 5 is a flowchart of operation of the vehicle 1 (and/or the FCA system 100 and/or the processor 150), according to an embodiment. FIGS. 6-9 are drawings for describing operation of the vehicle 1 (and/or the FCA system 100 and/or the processor 150), according to an embodiment.

Referring to FIG. 5, in an operation 501, the vehicle 1 determines whether there is the front object positioned in front of the same lane as the vehicle 1.

The vehicle 1 performs an operation 503 and/or an operation 509 when there is a front object positioned in front on the same lane as the vehicle 1, and otherwise, ends the operation of the embodiment of the present disclosure.

In the operation 503, the vehicle 1 determines whether a road edge object is present in at least one of the two side lanes of vehicle 1.

The vehicle 1 performs an operation 505 when there is a road edge object in at least one of the two side lanes of the vehicle 1 and, otherwise, performs operation 519.

In the operation 505, the vehicle 1 determines the safety zone based on the physical quantity information of the vehicle 1 and the front object.

Figure 6:
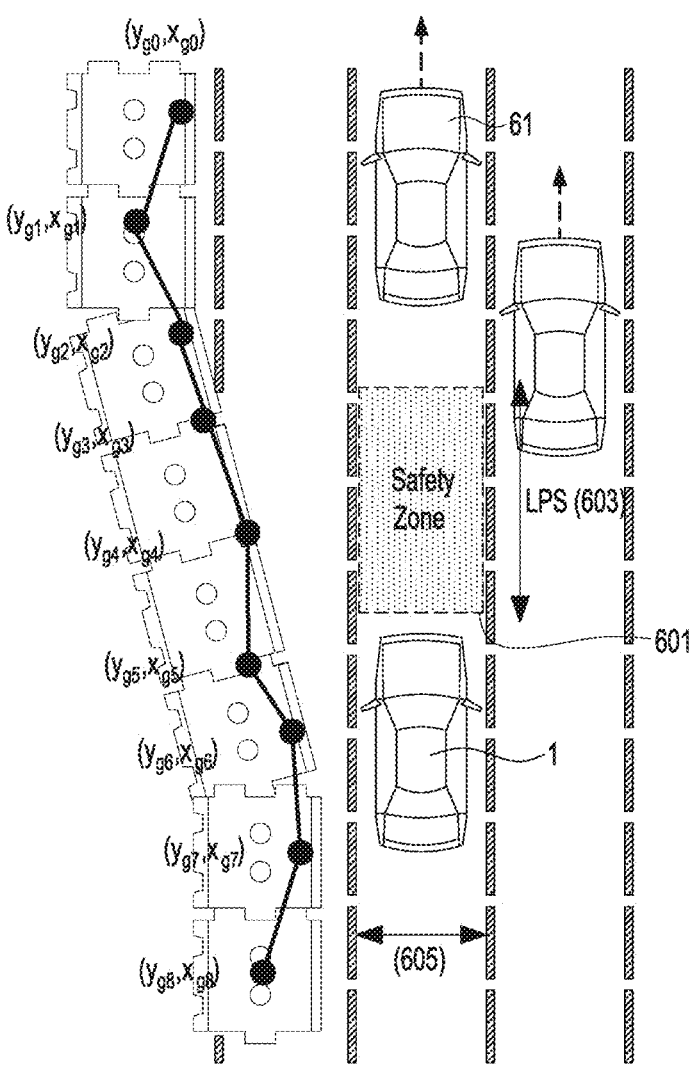
FIGS. 6 to 9 are drawings for describing a control operation of a vehicle, according to an embodiment of the present disclosure.
Figure 7:
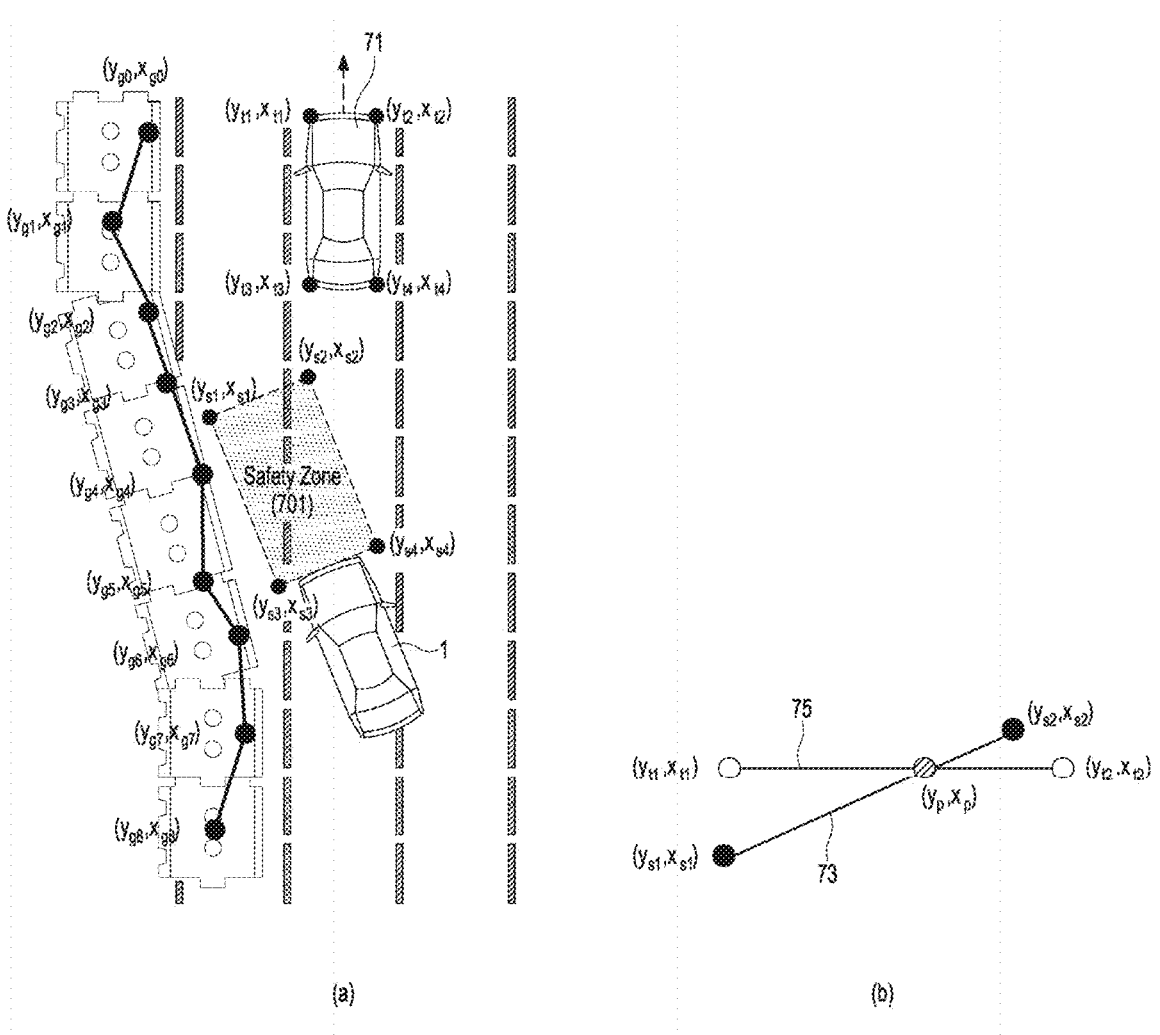
Figure 8:
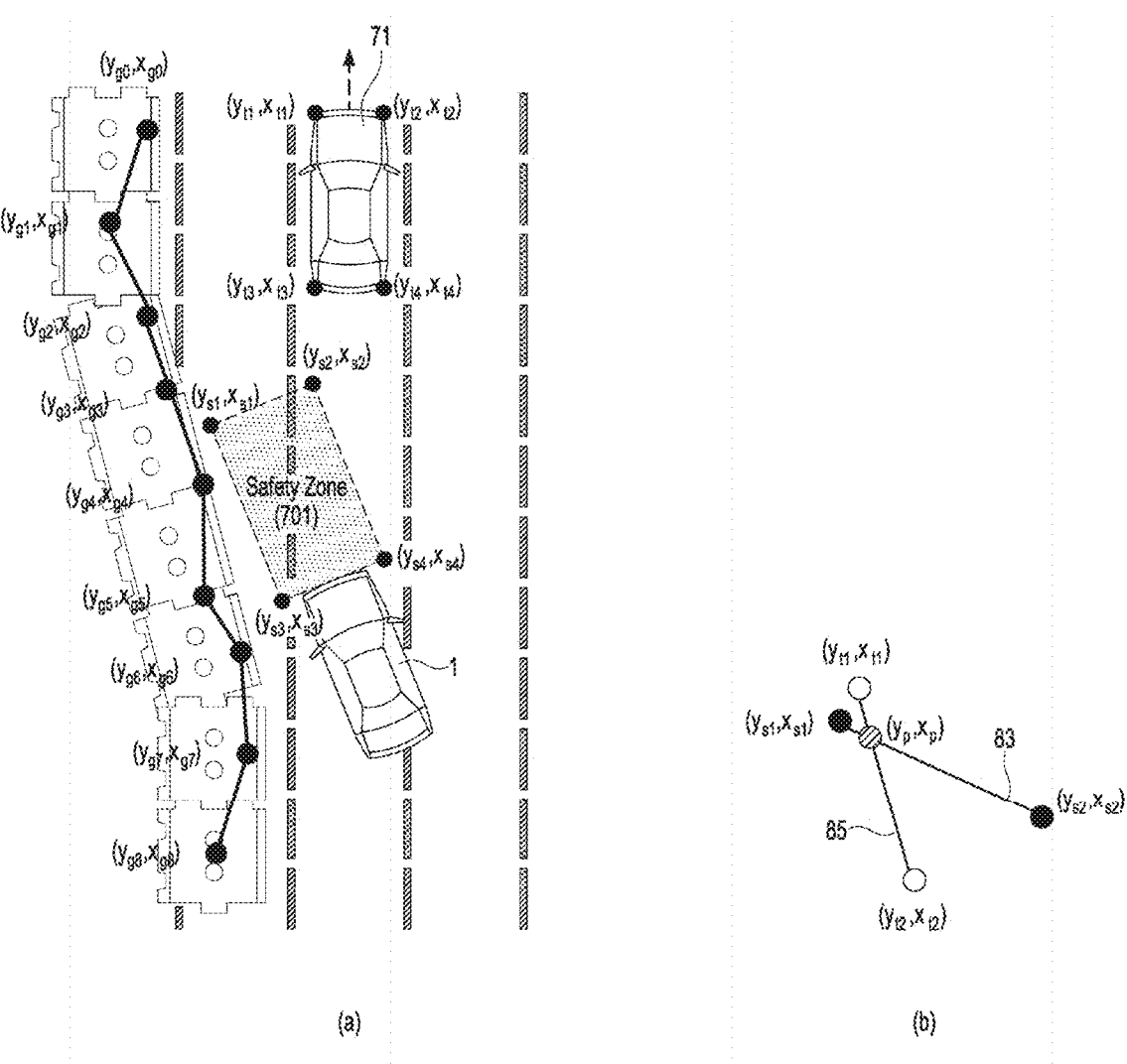
Figure 9:
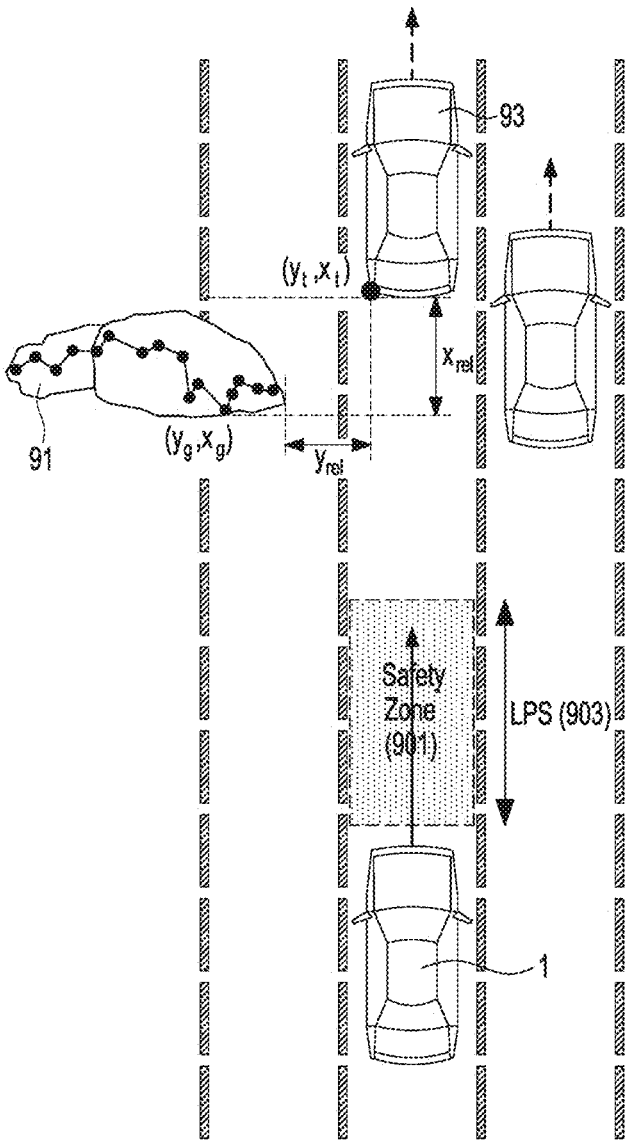

Referring to FIG. 6, the vehicle 1 determines a longitudinal length (also referred to herein as a last point steer (LPS)) 603 of a safety zone 601 based on a relative distance, a relative speed, and/or a relative acceleration with respect to a front object 61 of the vehicle 1. The relative distance, relative speed, and/or relative acceleration with respect to the front object 61 of the vehicle 1 are determined based on physical quantity information of the vehicle 1 and the front object 61.

For example, the vehicle 1 determines the longitudinal length 603 of the safety zone based on Equation 1 below.

$$d_{steering} = \sqrt{\frac{2 \cdot d_y}{a_{y\_max}}} \cdot v_{rel} + t_{delay} v_{rel} \qquad \text{Equation 1}$$

$$d_y = \frac{1}{2} a_{y\_max} t_y^2, \quad t_y = \sqrt{\frac{2 d_y}{a_{y\_max}}}$$

In Equation 1, $d_{steering}$ is the longitudinal length of a safety zone, $d_y$ is the distance required for vehicle 1 to avoid in a lateral direction (also referred to as a lateral distance between the vehicle 1 and a front object)), $v_{rel}$ is a relative speed between the vehicle quantity 1 and the front object, and ay_max is a lateral acceleration of the vehicle 1.

The vehicle 1 determines the width of one lane of the road on which the vehicle 1 travels as the lateral length 605 of the safety zone 601.

The width of one lane of the road on which the vehicle 1 travels may be predetermined and stored in the memory 130, or may be calculated based on data obtained from the sensor 10. For example, the width of one lane of the road on which the vehicle 1 travels is 3.6 m.

The vehicle 1 determines the safety zone 601 according to the driving route of the vehicle 1 based on the calculated longitudinal length 603 and lateral length 605 of the safety zone, which is based on the current position of the vehicle.

In an operation S507, the vehicle 1 determines whether a collision occurs between the safety zone according to the driving route of the vehicle 1, the front target object, and the road edge object.

The vehicle 1 calculates equations of four first straight lines connecting four corners of the safety zone. Also, the vehicle 1 calculates equations of four second straight lines connecting four edges of the object box indicating the front object. An object box indicating a front object body and four edges of the object box are determined based on sensor fusion information that is based on the data of the sensor 10.

Referring to FIG. 7A, four edges of the safety zone 701 have coordinates of points (ys1, xs1), (ys2, xs2), (ys3, xs3), and (ys4, xs4). Four corners of the object box indicating the front object 71 have coordinates of points of (yt1, xt1), (yt2, xt2), (yt3, xt3), (yt4, xt4).

The four equations of the first straight line and the four equations of the second straight line are calculated using Equation 2 below by connecting the point n−1 to the point n, i.e., connecting the point tn−1 to the point tn, and connecting the point sn−1 to the point sn.

$$y_{(n-1)n} = \frac{y_n - y_{n-1}}{(x_n - x_{n-1})}(x - x_{n-1}) + y_{n-1}$$

Equation 2

For example, the equation of a straight line connecting the point of the $(y_{s1}, x_{s1})$ coordinate and the point of the $(y_{s2}, x_{s2})$ coordinate can be determined as below:

$$y_{12} = \frac{y_{t2} - y_{t1}}{(x_{t2} - x_{t1})}(x - x_{t1}) + y_{t1}.$$

The vehicle 1 determines whether the first collision occurs between the safety zone 701 and the front object 71 based on the four first straight-line equations and the four second straight-line equations.

For example, the vehicle 1 determines an intersection point between the four first straight lines and the four second straight lines based on equations of the four first straight lines and equations of the four second straight lines.

In addition, the vehicle 1 determines that the safety zone 701 collides with the front object 71 when at least one of the determined intersections is positioned in the safety zone 701, and otherwise determines that the safety zone 701 does not collide with the front object 71.

Referring to FIG. 7B, when, for the vehicle 1, an equation of a straight line 73 among the first straight lines is $y=m_1x+b_1$, and an equation of a straight line 75 of the second straight lines is $y=m_2x+b_2$, the intersection point $(y_p, x_p)$ of the two straight lines is determined as below:

$$(y_p, x_p) = \left( \frac{b_2-b_1}{m_1 - m_2}, m_1 \frac{b_2 - b_1}{m_1 - m_2} + b_1 \right).$$

For example, when the following condition 1 is satisfied, the vehicle 1 determines that the safety zone 701 collides with the front object 71 (TRE=1).

if $(y_{s1} \le y_p \le y_{s2})$ AND $(x_{s1} \le x_p \le x_{s2}) \rightarrow T_{RE} = 1$      Condition 1

The vehicle 1 determines points indicating the road edge object based on the data of the sensor 1.

Referring to FIG. 8A, the vehicle 1 may determine points of coordinates of $(y_{g0}, x_{g0})$, $(y_{g1}, x_{g1})$, $(y_{g2}, x_{g2})$, $(y_{g3}, x_{g3})$, $(y_{g4}, x_{g4})$, $(y_{g5}, x_{g5})$, $(y_{g6}, x_{g6})$, $(y_{g7}, x_{g7})$, $(y_{g8}, x_{g8})$ as the points of a road edge object 81.

The vehicle 1 determines whether the safety zone 701 and the road edge object 81 collide with each other in the second direction based on equations of the four first straight lines and equations of the third straight line connecting points of the road edge object 81.

For example, equation (gn−1) of the third straight line connecting points of the road edge object 81 can be calculated by the above-described equation 2 by connecting the point and the gn point.

The vehicle 1 determines the intersection point between the first straight lines and the third straight lines based on the equations of the first straight lines and equations of the third straight lines.

In an embodiment, referring to FIG. 8B, when, for the vehicle 1, an equation of one straight line 83 among first straight lines is $y=m_{1x}+b_1$, and an equation of a straight line 75 of one of the second straight lines is $y=m_{1x}+b_2$, the intersection point $(y_p, x_p)$ of the two straight lines is determined as below:

$$(y_p, x_p) = \left( \frac{b_{2-b_1}}{m_{1-m_2}}, m_1 \frac{b_2 - b_1}{m_1 - m_2} + b_1 \right).$$

When the following condition 2 is satisfied, the vehicle 1 determines that the safety zone 701 collides with the load at object 81 ($T_{RE}=1$).

if $(y_{s1} \le y_p \le y_{s2})$ AND $(x_{s1} \le x_p \le x_{s2}) \rightarrow R_{RE} = 1$      Condition 2

The vehicle 1 determines whether a possibility of collision against the road edge object 81 on at least one of the two side lanes of the vehicle 1 is possible based on whether the first collision occurs between the safety zone 701 and the front object 71 and whether the second collision occurs between the safety zone 701 and the road edge object 81.

In the operation 509, the vehicle 1 determines whether a general obstacle is present in at least one of the lanes next to both side lanes of the vehicle 1.

The vehicle 1 performs operations 511 and 513 when a general obstacle is present in at least one of the two side lanes of the vehicle 1, or otherwise performs operation 519.

In the operation 511, the vehicle 1 determines the surrounding on the basis of the longitudinal positions of the front object and the general obstacle.

Referring to FIG. 9A, the vehicle 1 determines whether a longitudinal length 903 (also referred to as a last point steer (LPS)) of a safety zone 901 is equal to or greater than a longitudinal length $x_{rel}$ of a general intestinal obstruction 91. When the longitudinal length 903 (also referred to as a last point steer (LPS)) of the safety zone 901 is equal to or greater than the longitudinal length $x_{rel}$ of the general obstacle 91, the vehicle 1 digitizes the surrounding, e.g., determining the $D_{long}$ as 1 on the basis of the longitudinal position of the front object 93 and the front obstacle 91.

In the operation 513, the vehicle 1 determines the surrounding situation on the basis of the lateral positions of the front object and the general obstacle.

Referring to FIG. 9A, the vehicle 1 determines the first coordinate $(y_t, x_t)$ of an outermost point of the front object 93 closest to the general obstacle.

For example, the vehicle 1 determines coordinates $y_t$ and $x_t$ of an outermost point of the front object 93 (an outermost point close to a general obstacle 91) based on the relative distance between the front object 93 and the vehicle 1, width information of the front object, etc.

The vehicle 1 determines the second coordinates $y_g$ and $x_g$ of the outermost point of the general obstacle 91 closest to the forward object 93.

For example, the vehicle 1 determines coordinates $y_g$ and $x_g$ of an outermost point (an outermost point close to the front object 93) among contour points of the general obstacle 91.

The vehicle 1 determines the separated distance $y_{rel}$ (also referred to as a lateral distance or distance) between the front target object 93 and the general obstacle 91 based on the first coordinates $y_t$ and $x_t$ and the second coordinates $y_g$ and $x_g$.

The vehicle 1 determine whether the separated distance $y_{rel}$ is equal to or less than the width (e.g., 3.6 m) of the lane on which the vehicle 1 is traveling. When the width of the lane of on which the vehicle 1 is traveling is less than or equal to the width of the lane on which the vehicle 1 is traveling, the vehicle 1 digitizes the surroundings, e.g., determining $D_{lat}$ as 1 on the basis of the lateral positions of the front object 93 and the general obstacle 91.

In the operation 515, the vehicle 1 determines whether the vehicle 1 is capable of steering for avoiding collision based on the result of operation 507 and/or operation 511 and operation 513.

The vehicle 1 performs operation 519 when the vehicle 1 performs steering for avoiding collision, and performs operation 517 when the vehicle 1 is not capable of steering for avoiding collision.

The vehicle 1 determines whether steering for avoiding collision is possible with respect to the road edge object 81 on at least one of the two side lanes without a collision between the vehicle 1 and the front object 71 and the road edge object 81, according to the following condition 3, based on a result of determining the first collision and/or a result of determining the second collision according to operation 507.

For example, the result of determining the first collision includes the result of determining the first collision ($T_{RE, left}$) when the vehicle 1 is traveling on the left lane of the traveling lane and/or the result of determining first collision ($T_{RE, right}$) when the vehicle 1 is traveling on the right lane of the traveling lane. In addition, the result of determining the second collision includes the result of determining second collision ($T_{RE}$, left) when the vehicle 1 is traveling on the left lane and/or the result of determining the second collision (TRE, right) when the vehicle 1 is traveling on the right lane.

$$\text{if } (T_{RE,left} == 1) \text{ or } (R_{RE,left} == 1) \rightarrow C_{RE,left} = 1 \quad \text{Condition 3}$$
$$\text{if } (T_{RE,right} == 1) \text{ or } (R_{RE,right} == 1) \rightarrow C_{RE,right} = 1$$

In the above condition, $C_{RE, left}$ and $C_{RE, right}$ indicate a result of determining collision against the road edge object.

For example, when $T_{RE,left}$ is 1 or $R_{RE,left}$ is 1 as described above, $C_{RE,left}$ is determined as 1.

In addition, even when $T_{RE,left}$ and $R_{RE,left}$ are all 1, $C_{RE,left}$ is determined as 1. In addition, when $T_{RE,left}$ and $R_{RE,left}$ are all 0, it determines that $C_{RE,left}$ as 0.

As another example, when $T_{RE,right}$ is 1 or $R_{RE,right}$ is 1 as described above, $C_{RE,right}$ is determined as 1.

In addition, when $T_{RE,right}$ and $R_{RE,right}$ are 1, $C_{RE,right}$ is determined as 1. In addition, when $T_{RE,right}$ and $R_{RE,right}$ are 0, $C_{RE,right}$ is determined as 0.

In the above condition, when $C_{RE, left}$ is 1, the signifies that the vehicle 1 is unable to perform steering for avoiding collision on the road edge object of the left lane. Further, when $_{CRE, right}$ is 1, this signifies that the vehicle 1 is unable to perform steering for avoiding collision on the road edge object of the right lane.

In addition, when $C_{RE,left}$ is 0, this signifies defines that the vehicle 1 is capable steering for avoiding collision with respect to the road edge object of the left lane. Further, when $C_{RE,right}$ is 0, this signifies that the vehicle 1 is capable of steering for avoiding collision with respect to the road edge object of the right lane.

Based on the results of operations 511 and 513, the vehicle 1 determines whether steering for avoiding collision is possible with respect to the general obstacle 91 on at least one of the two side lanes according to the following condition 4.

For example, the results of operations 511 and 513 may include results $D_{left}$ and long of digitizing the surrounding based on the longitudinal position of the general obstacle 91 positioned on the left side of the vehicle 1, results $D_{left}$ and lat of digitizing the surrounding based on the lateral position of the general obstacle 91 positioned on the left side of the vehicle 1, results $D_{right}$ and long of digitizing the surrounding based on the longitudinal position of the general obstacle 91 positioned on the right side of the vehicle 1, and/or results $D_{right}$ and lat of digitizing the surrounding situation based on the lateral position of the general obstacle 91 positioned on the right side of the vehicle 1.

Condition 4

$$\text{if } (D_{left,long} == 1) \text{ or } (D_{left,lat} == 1) \rightarrow C_{GO,left} = 1$$

$$\text{if } (D_{right,long} == 1) \text{ or } (D_{right,lat} == 1) \rightarrow C_{GO,right} = 1$$

For example, when $D_{left,long}$ is 1 or $D_{left,lat}$ is 1 as described above, $C_{GO,left}$ is determined as 1.

In addition, when $D_{left,long}$ and Dleft, lat are all 1, it $C_{GO,left}$ is determined as 1. In addition, when $D_{left,long}$ and $D_{left,lat}$ are all 0, $C_{GO,left}$ is determined as 0.

As another example, when $D_{right,long}$ is 1 or $D_{right,lat}$ is 1 as described above, $C_{GO,right}$ is determined as 1.

In addition, when $D_{right,long}$ and $D_{right,lat}$ are all 1s, $C_{GO,right}$ is determined as 1. In addition, when $D_{right,long}$ and $D_{right,lat}$ are all 0s, $C_{GO,right}$ is determined as 0.

In the above condition, $C_{GO,left}$ and $C_{GO,right}$ indicate a result of determining a collision against the general obstacle.

In the above condition, when $C_{GO,left}$ is 1, this signifies that the vehicle 1 is unable to perform steering for avoiding collision with respect to the general obstacle on the left lane. Further, when $C_{GO,right}$ is 1, this signifies that the vehicle 1 is unable to perform steering for avoiding collision with respect to the general obstacle on the right lane. In addition, when $C_{GO,left}$ is 0, this signifies that the vehicle 1 is capable of steering for avoiding collision with respect to a general obstacle on the left lane. Further, when $C_{GO,right}$ is 01, this signifies that the vehicle 1 is capable of steering for avoiding collision with respect to a general obstacle on the right lane.

The vehicle 1 determines whether steering for avoiding collision is possible based on a combination of $C_{RE,left}$, $C_{RE,right}$, $C_{GO,left}$, and $C_{GO,right}$ determined according to the above-described operations as shown in Table 1 below.

TABLE 1

| Presence of main target | $C_{RE,\,left}$ | $C_{RE,\,right}$ | $C_{GO,\,left}$ | $C_{GO,\,right}$ | Result of determining the possibility of steering for avoidance (0: steering for collision avoidance possible, 1: steering for collision avoidance impossible) |
|---|---|---|---|---|---|
| 1 (present) | 0 | 0 | 0 | 0 | 0 |
|  | 0 | 0 | 0 | 1 | 0 |
|  | 0 | 0 | 1 | 0 | 0 |
|  | 0 | 0 | 1 | 1 | 1 |
|  | 0 | 1 | 0 | 0 | 0 |
|  | 0 | 1 | 0 | 1 | 0 |
|  | 0 | 1 | 1 | 0 | 1 |
|  | 0 | 1 | 1 | 1 | 1 |
|  | 1 | 0 | 0 | 0 | 0 |
|  | 1 | 0 | 0 | 1 | 1 |
|  | 1 | 0 | 1 | 0 | 0 |
|  | 1 | 0 | 1 | 1 | 1 |
|  | 1 | 1 | 0 | 0 | 1 |
|  | 1 | 1 | 0 | 1 | 1 |
|  | 1 | 1 | 1 | 0 | 1 |
|  | 1 | 1 | 1 | 1 | 1 |

In an operation 517, the vehicle 1 may determine whether to change a control time of the vehicle 1. The vehicle 1 may change the braking control time such that the braking control is performed when the front object positioned in front of the vehicle 1 on the same lane as the vehicle 1 is distanced apart from the vehicle by a predetermined distance. For example, the vehicle 1 may change a control time of braking including the primary emergency braking time and/or in the secondary emergency braking time as in the above-described embodiment of FIG. 4.

In an operation 519, the vehicle 1 performs braking control for avoiding collision or mitigating collision of the vehicle 1 based on the determination that the vehicle 1 is capable of steering for avoiding collision in operation 515 or based on operation 517.

In embodiments, the vehicle 1 performs an operation for avoiding collision when it is determined that steering for avoiding collision is possible. For example, according to the above-described operation, the vehicle 1 may be controlled so that the vehicle 1 changes lanes to the left lane or to the right lane of the vehicle 1 which is determined to not collide with the road edge object and also not collide with the general obstacle.

In addition, when it is determined that steering for avoiding collision is impossible, the vehicle 1 may perform the braking control at the changed time of control in order to mitigate the collision of the vehicle 1.

FIGS. 10-13 are drawings for comparative descriptions of a control operation of the FCA system 100 (and/or the processor 150) of the vehicle 1 according to an embodiment and a conventional system.

Figure 10:
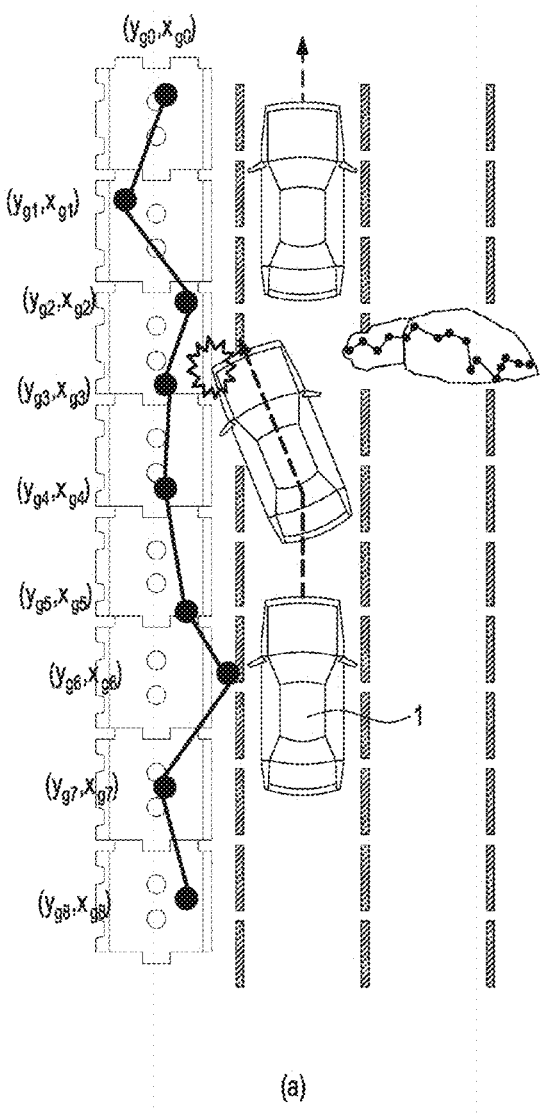
FIGS. 10-13 are drawings for a comparative description of a control operation of an FCA system for a vehicle according to an embodiment of the present disclosure and the prior art.

FIG. 10(*a*) is a drawing illustrating an example in which a guardrail corresponding to the road edge object is present on the left side of the driving lane of the vehicle 1 and a rock corresponding to the general obstacle is present on the right side of the driving lane of the vehicle 1.

When a surrounding environment as shown in FIG. 10(*a*) exists during a high-speed driving of the vehicle to which the related art is applied, when the vehicle of the conventional system performs FCA control on the front vehicle corresponding to the front object of the same lane, the vehicle collides against the guardrail.

For example, the FCA system of the vehicle to which the related art is applied does not use data of the front-side LiDAR. Although the FCA system of the vehicle to which the related art is applied detects general obstacles (e.g., rocks, etc.) positioned on the side surface of the vehicle through data of the front radar, there have been issues where sensitive operations and/or malfunctions of the FCA system with respect to a single track acquired through the front radar. Accordingly, the conventional FCA system utilizes data of the front radar only for moving objects.

Further, the FCA system of the vehicle to which the related art is applied identifies the presence of the guardrail at the side of the vehicle based on the free space information of the front camera and the front radar, but there have been issues of low reliability.

Accordingly, the conventional FCA system has an issue where it is impossible to determine whether steering for avoiding collision is possible due to the above-described problem even when steering for avoiding collision is impossible due to the presence of objects such as guardrails and/or rocks on both side lanes of the vehicle. Accordingly, the conventional vehicle performs the FCA control at the original time with respect to the preceding vehicle, and thus an issue of collision against surrounding objects of the vehicle occurs when the vehicle is traveling at high speed.

On the other hand, when the surrounding as shown in FIG. 10(*a*) exists during high-speed driving of the vehicle 1 to which the technology according to embodiments of the present disclosure is applied, the FCA system 100 of the vehicle 1 generates and/or outputs results as shown in FIG. 10(*b*).

Referring to FIG. 10(*b*) based on $C_{RE,\,left}$ being determined as 1, $C_{RE,\,right}$ being determined as 0, $C_{GO,left}$ being determine as 0, and $C_{GO,right}$ being determine as 1, the issue of steering for avoiding collision is possible to be determined and an output of 1 (steering for avoiding collision is impossible) may be provided. Accordingly, since it is impossible to perform steering for avoiding collision of the vehicle 1 on both lanes of the vehicle 1, the FCA system 100 of the vehicle 1 operates at a time earlier than the original time to increase a collision avoiding speed of vehicle 1.

Figure 11:
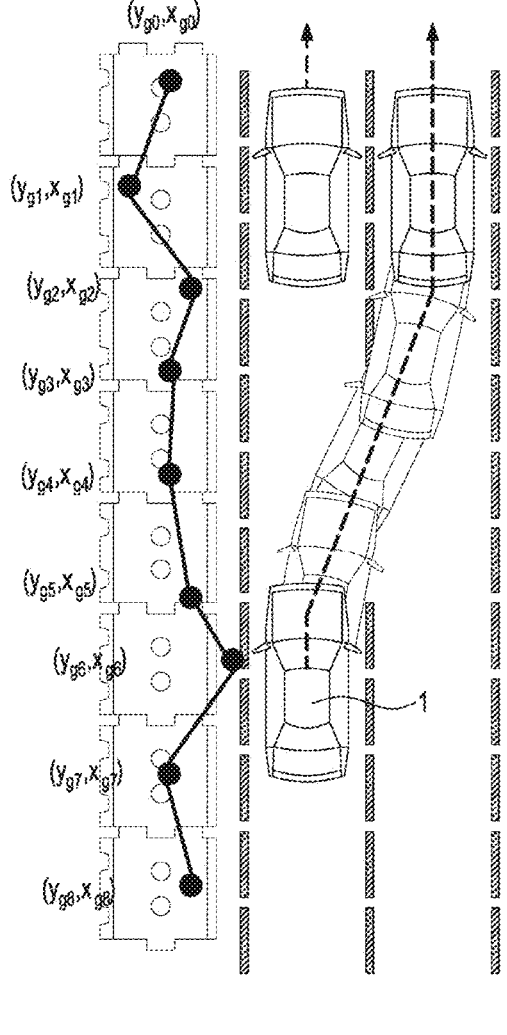

FIG. 11(*a*) is a drawing illustrating an example in which a guardrail corresponding to a road edge object is present on the left side of the driving lane of vehicle 1 and the right side of the driving lane of vehicle 1 is empty.

When the surrounding as shown in FIG. 11(*a*) is present during the driving of the vehicle to which the conventional technology is applied, the conventional FCA system of the vehicle performs FCA control on the front vehicle corresponding to the front object of the same lane.

For example, the conventional FCA system of the vehicle does not use data of the front-side LiDAR. The conventional FCA system of the vehicle identifies the presence of an object such as a guardrail at the side of the vehicle based on the free space information from the front camera and the front radar, but there have been issues of low reliability.

Accordingly, the conventional FCA system does not use road edge object, such as guardrails, information having low reliability as the control information, and thus, the conventional FCA system has an issue of determining that both side lanes of the vehicle are empty when there are surroundings as illustrated in FIG. 11(*a*). Accordingly, the conventional FCA system performs FCA control at an original time with respect to the front object positioned in front of the same vehicle as the vehicle, i.e., a preceding vehicle.

On the other hand, when the surrounding environment as shown in FIG. 11(*a*) is present while traveling of the vehicle 1 to which the technology according to embodiments of the present disclosure is applied, the FCA system 100 of the vehicle 1 generates and/or outputs a result as shown in FIG. 11(*b*).

Referring to FIG. 11(*b*) based on $C_{RE,\,left}$ being determined as 1, $C_{RE,\,right}$ being determined as 0, $C_{Go,\,left}$ being determined as 0, and $C_{GO,right}$ being determined as 0, whether steering for avoiding collision is possible can be determined and an output of 0 (steering for avoiding collision is possible) may be provided. Accordingly, although the vehicle 1 cannot drive to the left because the guardrail is present on the left side of the vehicle 1, the vehicle 1 can drive to the right because the right side is empty and steering for avoiding collision is possible, and thus the FCA system 100 is operated at the original time, and the driving lane of the vehicle 1 is changed to the right lane according to driver intention, thereby preventing collision between the vehicle 1 and the preceding vehicle.

Figure 12:
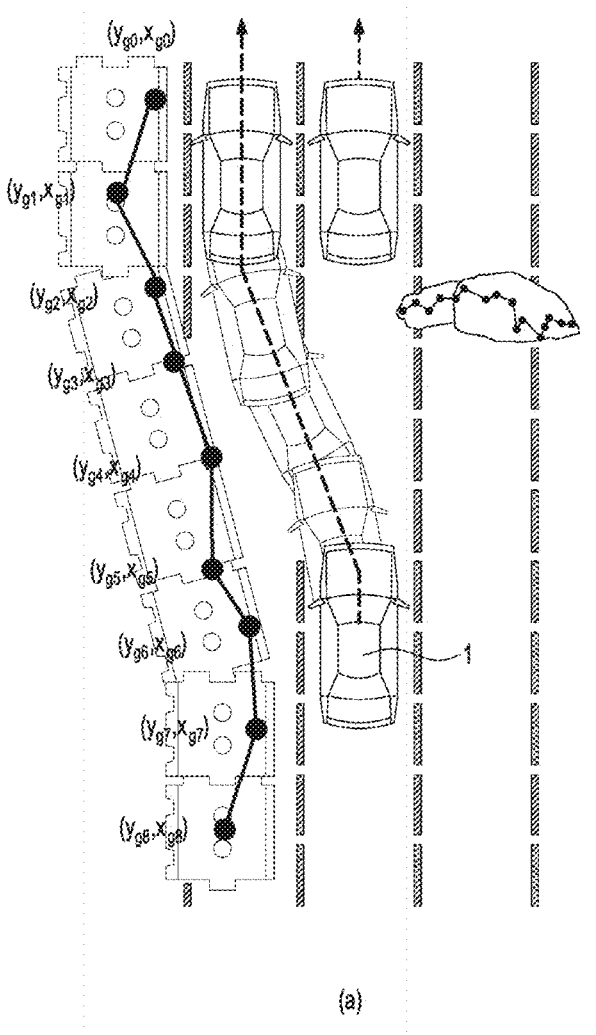

FIG. 12(*a*) is a drawing illustrating an example in which a guardrail corresponding to a road edge object is present on the left side of the driving lane of vehicle 1, but one or more lane spaces exist between the driving lane and the guardrail of the vehicle 1, and a general obstacle exists on the right side of the driving lane of the vehicle 1.

When a surrounding environment as shown in FIG. 12(*a*) exists during driving of a vehicle to which the related art is applied, the FCA system of the conventional vehicle performs FCA control on the front vehicle corresponding to the front object of the same lane.

For example, the conventional FCA system of the vehicle to which the related art is applied does not use data of the front-side LiDAR. Although the conventional FCA system of the vehicle detects general obstacles (e.g., rocks, etc.) positioned on the side surface of the vehicle from data of the front radar, there have been issues such as sensitive operations and/or malfunctions of the FCA system with respect to a single track acquired through the front radar. Accordingly, the conventional FCA system utilizes data of the front radar only for moving objects.

Further, the conventional FCA system of the vehicle to which the related art is applied identifies the presence of the guardrail at the side of the vehicle based on the free space information of the front camera and the front radar, but there has been issues of low reliability.

Accordingly, the conventional FCA system has issues of determining that an object is present on both lanes immediately adjacent to the driving lane of the vehicle when there is a surrounding as shown in FIG. 12(*a*). In the conventional FCA system, the FCA system of the conventional vehicle performs FCA control on the front vehicle corresponding to the front object of the same lane.

On the other hand, when the surrounding as shown in FIG. 12(*a*) exists while the vehicle 1 to which the technology according to embodiments of the applied, the FCA system 100 of the vehicle 1 generates and/or outputs a result as shown in FIG. 12(*b*).

Referring to FIG. 12(*b*), $C_{RE,left}$ may be determined as 0, $C_{RE,right}$ may be determined as 0, $C_{GO,left}$ may be determined as 0, and $C_{GO,right}$ may be determined as 1, and based on this, whether steering for avoiding collision is possible may be determined an output of 0 (steering for avoiding collision is possible) may be provided. Accordingly, although the guardrail is present on the left side of the vehicle 1, the vehicle 1 drives on the lane between the main lane and the guardrail of the vehicle 1, i.e., performs steering for avoiding collision, at a time when steering for avoiding collision of the vehicle 1 is required. Therefore, the FCA system 100 of the vehicle 1 operates at an original time, and controls the vehicle 1 to change to the right lane according to driver intention, thereby preventing a collision between the vehicle 1 and the preceding vehicle.

Figure 13:
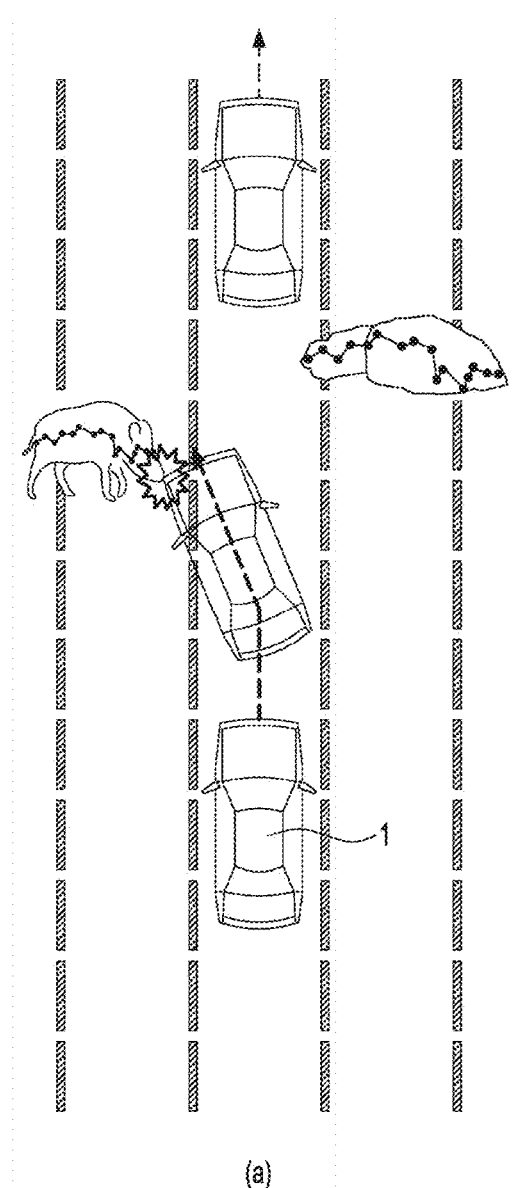

FIG. 13(*a*) is a diagram illustrating an example in which a general obstacle is present on both lanes of the driving lane of vehicle 1.

When the surrounding environment as shown in FIG. 13(*a*) exists during high-speed driving of the vehicle to which the related art is applied, and the conventional vehicle performs FCA control on the front vehicle corresponding to the front object of the same lane, there has been an issue where the vehicle collides with the general obstacle on any one of the two lanes of the driving lane of vehicle 1.

For example, the FCA system of the vehicle of the applied related art does not use data of the front-side LiDAR. Although the FCA system of the vehicle of the applied related art detects general obstacles (e.g., rocks and the like) positioned on the side surface of the vehicle through data of the front radar, there have been issues such as sensitive operations and/or malfunctions of the FCA system with respect to a single track acquired through the front radar. Accordingly, the conventional FCA system utilizes data of the front radar only for moving objects.

Accordingly, the conventional FCA system has an issue where it is impossible to determine whether steering for avoiding collision is possible due to the above-described problem even when steering for avoiding collision is impossible in the case where the surrounding as shown in FIG. 13(*a*) exists. Accordingly, the conventional vehicle performs the FCA control at the original time with respect to the preceding vehicle, and thus when the vehicle travels at high speed, an issue where a collision with the surrounding objects of the vehicle occurs.

On the other hand, when there is a surrounding as shown in FIG. 13(*a*) while the vehicle 1 to which the technology according to the embodiments of the present disclosure is applied, the FCA system 100 of the vehicle 1 generate s and/or outputs the results as shown in FIG. 13(*b*).

Referring to FIG. 13(*b*), $C_{RE,left}$ may be determined as 0, $C_{RE,right}$ may be determined as 0, $C_{GO,left}$ may be determined as 1, and $C_{GO,right}$ may be determined as 1, and based on this, whether steering for avoiding collision is possible may be determined and an output of 1 (steering for avoiding collision is possible) may be provided. Accordingly, since steering for avoiding collision is not possible to any of two side lanes of vehicle 1, the FCA system 100 of the vehicle 1 operates at a time earlier than the original time to increase the collision avoiding speed of vehicle 1.

According to embodiments, the vehicle 1 identifies whether there are road edge objects such as guardrails and/or curbs, and general obstacles, such as animals and/or rocks, present on both side lanes of the driving lane of vehicle 1, based on the information of the front-side LiDAR and free space information acquired through data of the sensor 10, such as front-side LiDARs, front cameras, and/or front radars. In addition, the vehicle 1 determines whether steering for avoiding collision of the vehicle 1 is possible with respect to various surroundings, as compared to the related art, based on the determination of whether a road edge object and/or a general obstacle is present on both side lanes of the driving lane of the vehicle 1.

Figure 14:
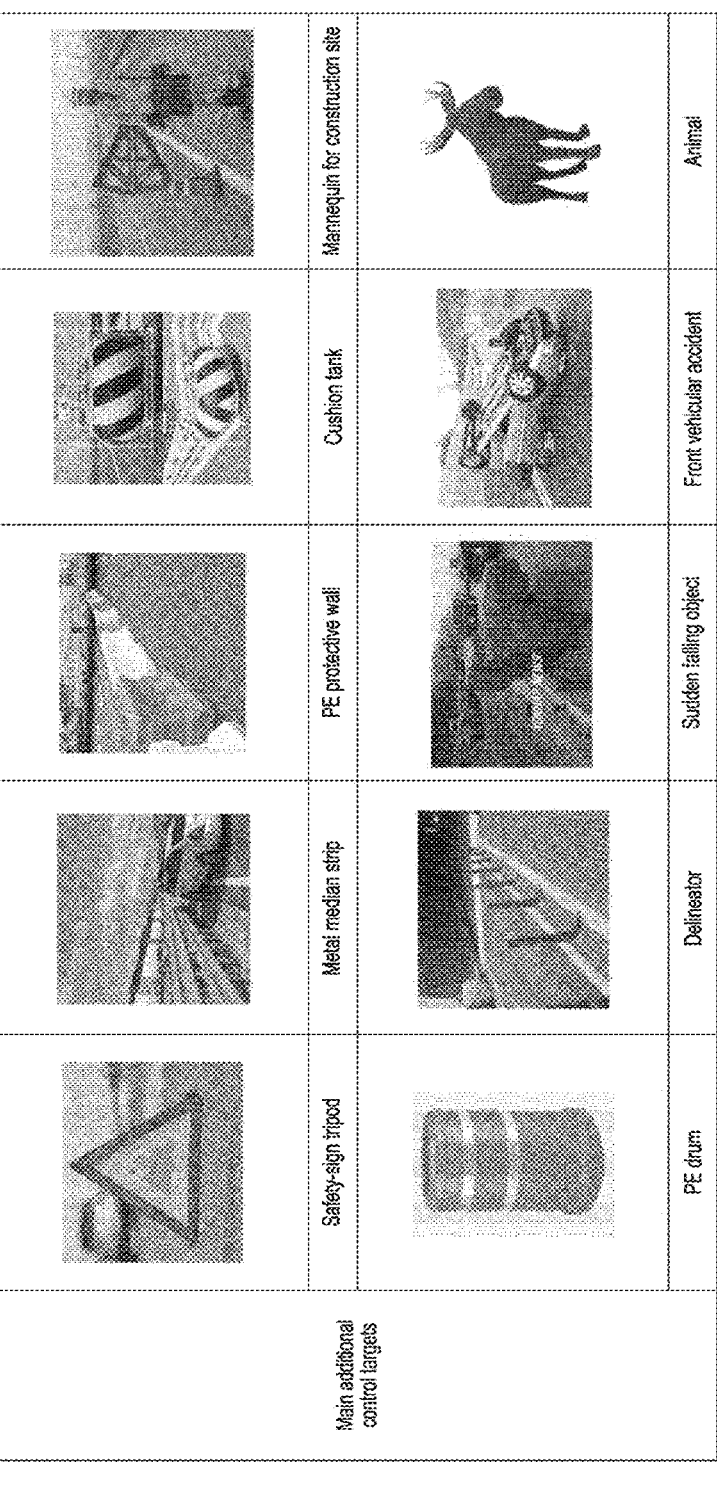
FIG. 14 is a drawing illustrating an example of main additional control target objects of an FCA system of a vehicle, according to an embodiment of the present disclosure.

FIG. 14 is a drawing illustrating an example of the additional control objects of the FCA system 100 of the vehicle 1, according to an embodiment.

Referring to FIG. 14, the road edge and/or the general obstacle in embodiments may include a safety-sign tripod, a metal median strip, a PE protective wall, a cushion tank, a PE drum, a delineator, a sudden falling object, and/or a front vehicular accident, and further includes other objects that obstructs driving of the vehicle 1.

Embodiments of the present disclosure may be implemented in the form of a recording medium for storing instructions executable by a computer. The instructions may be stored in the form of a program code, and when executed by a processor, cause the processor to perform operations of the disclosed embodiments. The recording medium may be implemented as a computer-readable recording medium.

The computer-readable recording medium includes all types of recording media in which computer-readable instructions are stored. For example, the instances of recording media are a Read Only Memory (ROM), a Random Access Memory (RAM), a magnetic tape, a magnetic disk, a flash memory, an optical data storage device, etc.

The embodiments disclosed above have been described with reference to the accompanying drawings. It should be understood by those having ordinary skill in the art to which the present disclosure pertains that the technology of the present disclosure may be implemented in a different form from the disclosed embodiments without changing the technical concept or essential feature of the present disclosure. The disclosed embodiments are illustrative and should not be construed as limiting.

What is claimed is:

1. A method for controlling a vehicle, the method comprising:

determining whether one or more objects are present on both side lanes of the vehicle in response to identification of a front object positioned on a lane in which the vehicle is positioned, wherein determining whether the one or more objects are present on both side lanes of the vehicle includes determining whether a road edge object or a general obstacle is present on at least one of the both side lanes of the vehicle;

determining a safety zone for the vehicle based on physical quantity information of the vehicle and the front object, when the one or more objects are present on both side lanes of the vehicle;

determining whether steering for avoiding collision with the one or more objects on both side lanes of the vehicle is possible based on the determined safety zone, including:

determining whether a first collision occurs between the safety zone and the front object based on four first straight lines of edges of the safety zone and four second straight lines of edges of an object box indicating the front object, when the road edge object is present on at least one of the both side lanes, determining whether a second collision occurs between the safety zone and the road edge object based on the four first straight lines and a third straight line connecting points of the road edge object, and determining whether steering for avoiding collision is possible based on a result of determining whether the first collision occurs and a result of determining whether the second collision occurs;

determining a braking control time of the vehicle based on the determination of whether steering for avoiding collision is possible; and controlling brakes of the vehicle at the determined braking control time.

2. The method of claim 1, wherein the identification of the front object and the determination of whether the one or more objects are present on both side lanes of the vehicle are based on data of a sensor including at least one of a camera, a radar, or a LiDAR.

3. The method of claim 1, wherein determining the safety zone of the vehicle includes determining a longitudinal length of the safety zone based on a relative distance, a relative speed, and a relative acceleration with respect to the front object and determining a width of one lane of a road where the vehicle travels as a lateral length of the safety zone.

4. The method of claim 1, wherein determining whether the first collision occurs includes determining at least one intersection point between the four first straight lines and the four second straight lines and determining that the safety zone collides with the front object when the at least one intersection point is positioned in the safety zone.

5. The method of claim 1, wherein determining whether the second collision occurs includes determining at least one intersection point between the four first straight lines and the third straight line and determining that the safety zone collides with the front object when the at least one intersection points is positioned in the safety zone.

6. The method of claim 1, wherein determining whether steering for avoiding collision is possible includes determining whether steering for avoiding collision is possible for the general obstacle based on a comparison between a longitudinal length of the safety zone and a longitudinal length of the general obstacle when the general obstacle is present on at least one of the both side lanes.

7. The method of claim 6, wherein determining whether steering for avoiding collision is possible includes:

determining a first coordinate of an outermost point of the front object closest to the general obstacle, determining a second coordinate of an outermost point of the general obstacle closest to the front object, determining a separated distance between the front object and the general obstacle based on the first coordinate and the second coordinate, and determining whether steering for avoiding collision is possible for the general obstacle based on the comparison between the separated distance and a width of one lane of a road where the vehicle travels.

8. A vehicle comprising:

an interface configured to receive data from a sensor; and a processor configured to be communicatively or electrically connected to the interface, wherein the processor is configured to:

identify a front object positioned on a same lane as the vehicle based on the data received through the interface, determine whether one or more objects are present on both side lanes of the vehicle based on the data received through the interface in response to identification of the front object, wherein the processor is configured to determine whether a road edge object or a general obstacle is present on at least one of the both side lanes of the vehicle, determine a safety zone for the vehicle based on physical quantity information of the vehicle and the front object, when the one or more objects are present on both side lanes of the vehicle, determine whether steering for avoiding collision with the one or more objects on the both side lanes of the vehicle based on the determined safety zone, wherein the processor is configured to:

determine a first collision between the safety zone and the front object based on four first straight lines of edges of the safety zone and four second straight lines of edges of an object box indicating the front object, determine a second collision between the safety zone and the road edge object based on the four first straight lines and a third straight line connecting points of the road edge object, and determine whether steering for avoiding collision is possible based on a result of determining whether the first collision occurs and a result of determining whether the second collision occurs, determine a braking control time of the vehicle based on the determination of whether steering for avoiding collision is possible, and output a control signal to enable a braking control of the vehicle at the braking control time.

9. The vehicle of claim 8, wherein the sensor comprises at least one of a camera, a radar, or a LiDAR.

10. The vehicle of claim 8, wherein the processor is further configured to:

determine a longitudinal length of the safety zone based on a relative distance, a relative speed, and a relative acceleration of the front object, and determine a width of one lane of a road where the vehicle travels as a lateral length of the safety zone.

11. The vehicle of claim 8, wherein the processor is configured to:

determine at least one intersection point between the four first straight lines and the four second straight lines, and determine that the safety zone and the front object collide when the at least one intersection point is positioned in the safety zone.

12. The vehicle of claim 8, wherein the processor is further configured to:

determine at least one intersection point between the four first straight lines and the third straight line, and determine that the safety zone and the front object collide when the at least one intersection point is positioned in the safety zone.

13. The vehicle of claim 8, wherein the processor is further configured to determine whether steering for avoiding collision is possible with respect to the general obstacle based on a comparison between a longitudinal length of the safety zone and a longitudinal length of the general obstacle, when the general obstacle is present on at least one of the both side lanes.

14. The vehicle of claim 13, wherein the processor is further configured to:

determine a first coordinate of an outermost point of the front object closest to the general obstacle, determine a second coordinate of an outermost point of the general obstacle closest to the front object, determine a separated distance between the front object and the general obstacle based on the first coordinate and the second coordinate, and determine whether steering for avoiding collision is possible for the general obstacle based on the comparison between the separated distance and a width of one lane of a road where the vehicle travels.

* * * * *